US009188991B2

(12) United States Patent
Pingert et al.

(10) Patent No.: US 9,188,991 B2
(45) Date of Patent: Nov. 17, 2015

(54) MICROFLUIDIC DEVICE AND A METHOD OF MANUFACTURING A MICROFLUIDIC DEVICE

(71) Applicant: Sony DADC Austria AG, Anif (AT)

(72) Inventors: Michael Pingert, Salzburg (AT); Dario Borovic, Hallein (AT); Alfred Paris, Salzburg (AT)

(73) Assignee: Sony DADC Austria AG, Anif (AT)

( * ) Notice: Subject to any disclaimer, the term of this patent is extended or adjusted under 35 U.S.C. 154(b) by 153 days.

(21) Appl. No.: 14/052,044

(22) Filed: Oct. 11, 2013

(65) Prior Publication Data

US 2014/0102546 A1  Apr. 17, 2014

(30) Foreign Application Priority Data

Oct. 12, 2012 (EP) .................................. 12188347

(51) Int. Cl.
*G05D 7/06* (2006.01)
*B01L 3/00* (2006.01)
(Continued)

(52) U.S. Cl.
CPC ........ *G05D 7/0694* (2013.01); *B01L 3/502707* (2013.01); *B29C 65/1638* (2013.01); *B29C 65/1654* (2013.01); *B29C 66/1122* (2013.01); *B29C 66/24221* (2013.01); *B29C 66/54* (2013.01); *B29C 66/65* (2013.01);
(Continued)

(58) Field of Classification Search
CPC .................. B01L 3/502707; B01L 2300/0887; B29C 65/1638; B29C 65/1654; B29C 66/65; B29C 66/24221; B29C 66/54; B29C 66/836; B29C 66/863; B29C 66/1122; B29C 65/1616; B81C 3/001; B29L 2031/756

USPC ............ 356/237.1; 137/15.01, 315.01, 561 R
See application file for complete search history.

(56) References Cited

U.S. PATENT DOCUMENTS 6,176,962 B1 *  1/2001  Soane et al. ................... 156/292
6,290,791 B1 *  9/2001  Shaw et al. ..................... 156/64
(Continued)

FOREIGN PATENT DOCUMENTS

JP  2625885 B2  4/1997
JP  4274251 B2  3/2009
(Continued)

OTHER PUBLICATIONS

Extended European Search Report Issued Jan. 28, 2014, in European Patent Application No. 13187740.9.
(Continued)

*Primary Examiner* — John K Fristoe, Jr.
*Assistant Examiner* — Kevin Barss
(74) *Attorney, Agent, or Firm* — Oblon, McClelland, Maier & Neustadt, L.L.P.

(57) ABSTRACT

A microfluidic device comprising in sequence first, second and third layers of plastics materials. A microfluidic circuit including a laterally extending microfluidic channel is formed at the interface between the first and second layers by surface structure in one or both of the first and second layers. A via is formed in the third layer for supplying or removing fluid to or from the microfluidic circuit. A conduit is formed in the second layer to provide fluid communication between the microfluidic channel and the via. A weld is formed at the interface between the second and third layers in a continuous closed path around the via and forms a fluid-tight seal for fluid flow between the via and the microfluidic circuit.

16 Claims, 6 Drawing Sheets

(51) Int. Cl.
*B29C 65/00* (2006.01)
*B29C 65/16* (2006.01)
*B29L 31/00* (2006.01)

(52) U.S. Cl.
CPC ............ *B29C 66/836* (2013.01); *B29C 66/863* (2013.01); *B01L 2300/0887* (2013.01); *B29C 65/1616* (2013.01); *B29L 2031/756* (2013.01); *Y10T 137/0402* (2015.04); *Y10T 137/8593* (2015.04)

(56) References Cited

U.S. PATENT DOCUMENTS

| | | | |
|---|---|---|---|
| 6,595,232 B2* | 7/2003 | Guzman et al. | 137/15.01 |
| 6,988,317 B2 | 1/2006 | Sjolander et al. | |
| 7,007,760 B2* | 3/2006 | Lohbeck | 166/384 |
| 7,165,566 B2* | 1/2007 | Beebe | 137/15.01 |
| 7,964,439 B2* | 6/2011 | Kim et al. | 438/99 |
| 8,790,484 B2* | 7/2014 | Schmidt et al. | 156/272.8 |
| 2002/0176804 A1* | 11/2002 | Strand et al. | 422/100 |
| 2004/0148777 A1 | 8/2004 | Sjolander et al. | |
| 2005/0072946 A1* | 4/2005 | Studer et al. | 251/11 |
| 2005/0100712 A1* | 5/2005 | Simmons et al. | 428/172 |
| 2005/0208271 A1* | 9/2005 | Fasching et al. | 428/156 |
| 2006/0108012 A1* | 5/2006 | Barrow et al. | 137/806 |
| 2007/0051706 A1* | 3/2007 | Bovatsek et al. | 219/121.69 |
| 2007/0125489 A1* | 6/2007 | Paul et al. | 156/272.8 |
| 2008/0231940 A1 | 9/2008 | Imanishi | |
| 2009/0283844 A1* | 11/2009 | Sparks | 257/414 |
| 2010/0037706 A1* | 2/2010 | Sparks et al. | 73/861.355 |
| 2011/0076204 A1 | 3/2011 | Schmidt et al. | |
| 2011/0233059 A1* | 9/2011 | Grundig et al. | 204/400 |
| 2011/0243813 A1 | 10/2011 | Jackinsky et al. | |
| 2012/0132290 A1* | 5/2012 | Tonkovich et al. | 137/14 |
| 2014/0322100 A1* | 10/2014 | Laermer et al. | 422/505 |

FOREIGN PATENT DOCUMENTS

| | | |
|---|---|---|
| WO | WO 2011/113630 A2 | 9/2011 |
| WO | WO 2013/023448 A1 | 2/2013 |

OTHER PUBLICATIONS

Ben Coxworth, "Process for laser-welding clear plastics developed" Good Thinking, Feb. 2, 2011, 4 Pages.

Anne Mantymaa, et al., "The effects of laser welding on heterogeneous immunoassay performance in a microfluidic cartridge" Biomicrofluidics, vol. 5, No. 4, Dec. 2011, 5 Pages.

Abdirahman Yussuf, et al., "Sealing and Bonding Techniques for Polymer-Based Microfluidic Devices" Industrial Research Institute Swinburne, 2007, pp. 269-275.

* cited by examiner

MICROFLUIDIC DEVICE AND A METHOD OF MANUFACTURING A MICROFLUIDIC DEVICE

BACKGROUND OF THE DISCLOSURE

The disclosure relates to microfluidic devices and methods of manufacture and inspection thereof.

Microfluidic circuits are typically manufactured as planar structures from two substrates which are bonded together and arranged in a carrier. The carrier is sometimes referred to as a caddy. In the case of polymer substrates, solvent vapour bonding can be used to bond the substrates. For glass substrates, suitable cement can be used. Microfluidic circuit elements, such as channels and mixing chambers, are formed at the interface between the substrates by surface structure in one or both of the substrates. In addition, to supply fluid to the circuit and to remove fluid from the circuit, one of the substrates has through holes to provide external access, these through holes being aligned with corresponding through holes in the carrier. Fluid-tight seals are needed around these external access points to prevent liquid leakage or pressure loss between the carrier and the adjacent substrate. These seals are conventionally provided by O-rings or other forms of gasket made of resilient material.

FIG. 8 is a schematic cross-section showing features of such a conventional microfluidic device. The device comprises first and second substrates 2 and 4 arranged in a carrier 6. A laterally extending channel 12 is shown at the interface between the substrates formed by surface structure on one face of the first substrate 2. The second substrate 4 has a through hole 10 which is in fluid communication with the channel 12 and which is aligned with a further through hole 8 in the carrier. An O-ring 27 is arranged around the through hole 8/10 (as considered in plan view) at the interface between the second substrate 4 and the carrier 6. Location of the O-ring 27 is aided by ring-shaped grooves or surface indentations 28 in the carrier 6 and/or second substrate 4 (both in the figure). One end of a male luer connector 26 is also schematically illustrated having a tip portion with a diameter dimensioned to fit into the hole 10 and a location portion having a larger diameter which is greater than the diameter of the hole 10, but less than the diameter of the hole 8, so that a shoulder is formed at the transition between the location portion and tip portion which serves as an abutment surface. The holes 8 and 10 and seal 27, 28 therefore collectively form a female luer connection.

FIG. 9 is a schematic cross-section showing features of a specific prior art device from US 2011/0243813 A1. An opaque layer 4 is sandwiched between transparent layers 2, 6. The layer 4 is perforated to carry a microfluidic circuit structure made up of channels, mixing chambers and so forth, whereas the layers 2 and 6 are essentially unstructured except for layer 6 carrying an inlet port and a vent for external fluid communication. Specifically, layer 6 has a through hole 8 for external input of liquid, which is in fluid communication with a larger diameter chamber 15 formed in layer 4 which leads into a capillary channel 12, also formed in layer 4. Laser welding is used to bond the layers together.

US 2004/0148777 A1 also discloses a microfluidic device made of two, three or four rigid layers in which laser welding is used to bond the layers together.

FIG. 10 is a schematic cross-section showing features of a specific prior art device from WO 2011/113630 A2. First and second substrate layers 2 and 6 sandwich a resilient elastomeric gasket layer 4 which is also opaque to laser radiation from a laser welding apparatus. A channel 12 is formed by mutually facing surface structure in the substrate layers 2 and 6, and a similarly shaped aperture in the gasket layer 4. The channel 12 is sealed by a laser weld 20 having a weld seam or weld joint which partly or fully runs around the channel 12 and which is somewhat laterally offset from the channel 12.

US 2011/0076204 A1 discloses a valve for a microfluidic device which employs a three layer structure similar to FIG. 10 with two outer layers sandwiching an elastomeric middle layer. Again similar to the device of FIG. 10, a seam weld is provided by laser welding in a joint line around the channel somewhat laterally offset from the channel 12.

SUMMARY OF DISCLOSURE

According to a first aspect of the disclosure, there is provided a microfluidic device comprising:
a first substrate;
a second substrate bonded to the first substrate at an interface between the first substrate and the second substrate;
a microfluidic circuit formed at the interface by surface structure in one or both of the first and second substrates;
a third substrate having a plurality of vias which are in fluid communication with the microfluidic circuit through respective conduits in the second substrate; and
a plurality of seam welds, each extending continuously in a closed path around respective ones of the vias, each seam weld serving to weld together the second and third substrates and form a fluid-tight seal for fluid flow between the via and the microfluidic circuit.

The third substrate can extend around and accommodate the first and second substrates to form at least part of an external housing by which the device can be handled. The external housing may be referred to as a caddy or carrier.

In some embodiments, the substrates are made of plastics materials. More generally, the substrates can be made of any material that can be bonded thermally with seam welds of suitable feature width, for example polymer-coated glass or polymer-coated silicon. The bond between the first and second substrate can be a solvent vapour bond. The plastics materials can be polymers. The first and second substrates can be formed of substantially the same base polymers, for example to facilitate chemical bonding such as solvent vapour bonding. The third substrate can be formed of a different base polymer from the second substrate, since the welding process is principally a thermal (physical) one, not a chemical one, so chemical compatibility is not required.

The conduit and the via can be formed as mutually aligned, vertically extending through holes in the second and third substrates. They may be of circular section and concentric and may have the same diameters or different diameters. Arbitrary shapes are possible in principle. Functionally what is important is that the conduit and via are in fluid communication with each other.

In some implementations, a mixture of weld seals and conventional gasket seals may be used. Namely, one or more of the vias can be sealed with a resilient gasket arranged between the second and third substrate, while other vias are sealed with seam welds.

To enable one particular type of welding process during manufacture, the first and second substrates are substantially transparent or transmissive to a particular wavelength of light and the third layer is substantially opaque or absorptive to the particular wavelength.

The structure may be extended with further substrates. For example, fourth and fifth substrates may be provided. The fifth substrate is bonded to the fourth substrate and a further microfluidic circuit is formed by surface structure in one or both of the fourth and fifth substrates. The fourth substrate has a plurality of further conduits which bring respective ones of the vias, and thus the further microfluidic circuit into fluid communication with the microfluidic circuit. A plurality of further seam welds is provided, each extending continuously in a closed path around respective ones of the vias, each further seam weld serving to weld together the third and fourth substrates and forms a fluid-tight seal for fluid flow between the microfluidic circuit and the further microfluidic circuit.

According to an alternative definition of the first aspect of the disclosure, there is provided a microfluidic device comprising:
a first substrate,
a second substrate bonded to the first substrate at an interface between the first substrate and the second substrate,
a microfluidic circuit element formed at the interface by surface structure in one or both of the first and second substrates,
a third substrate having a via which is in fluid communication with the microfluidic circuit element through a conduit in the second substrate,
a seam weld extending in a continuous closed path around the via to weld together the second and third substrates and form a fluid-tight seal for fluid flow between the via and the microfluidic circuit element.

According to a second aspect of the disclosure there is provided a method of manufacturing a microfluidic device comprising:
providing an optical source operable to deliver an optical beam;
providing first, second and third substrates, one or both of the first and second substrates having surface microstructure, and the second and third substrates having at least one respective conduit and via pair;
bonding the first and second layers to each other such that the surface microstructure forms a microfluidic circuit at the interface between the first and second substrates;
arranging the second and third substrates in juxtaposition such that the respective conduits and vias align; and
arranging the optical source to deliver the optical beam through the first and second substrates to the third substrate; and
operating the optical beam to form a continuous seam weld between the second and third substrates in a closed path around the via.

In one welding mode, the first and second substrates are substantially transparent or transmissive to a particular wavelength of light and the third substrate is substantially opaque or absorptive to the particular wavelength.

In another welding mode, an objective lens is arranged to bring the optical beam to a focus in the plane of the interface between the second and third substrates such that it causes melting confined to a region local to the interface.

The optical source can be a laser or other suitable light source, such as a high brightness light emitting diode, e.g. a superluminescent diode, or diode array.

In a third aspect of the disclosure there is provided an inspection method for a microfluidic device manufactured according to the above method, comprising an optical inspection of integrity of the weld using a microscope. The weld inspection can be carried out with the microscope imaging in a focal plane coincident with the interface between the second and third layers and wherein a further inspection is carried out with the focal plane of the microscope coincident with the interface between the first and second layers to inspect the microfluidic channel.

BRIEF DESCRIPTION OF THE DRAWINGS

By way of example, the disclosure is described with reference to the following drawings.

DETAILED DESCRIPTION

Figure 1:
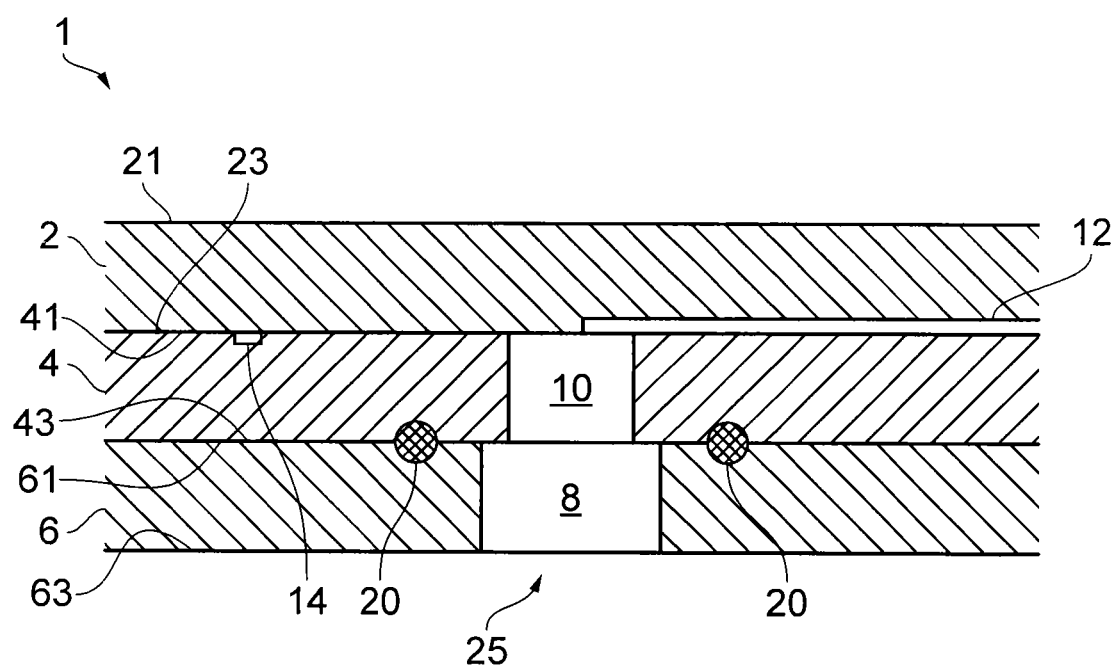
FIG. 1 is a schematic cross-section of a portion of a microfluidic device according to a first embodiment of the disclosure.

FIG. 1 is a schematic cross-section of a portion of a microfluidic device 2 according to a first embodiment of the disclosure.

The illustrated portion shows first, second and third layers 2, 4 and 6, each made of a plastics material such as a polymer, in particular one of the polymers listed below in the section describing an injection moulding process. The first layer 2 has a top surface 21 and a bottom surface 23. The second layer 4 has a top surface 41 and bottom surface 43. The third layer 6 has a top surface 61 and bottom surface 63.

The bottom surface 23 of the first layer 2 is bonded to the top surface 41 of the second layer 4, for example by a solvent vapour bonding process in the case of polymer layers. A laterally extending microfluidic channel 12 is illustrated at the interface 23/41 between the first and second layers 2, 4 by surface structure in one or both of the first and second layers 2, 4 (in the illustration the surface structure is solely in the first layer 2). Another example channel 14 is also illustrated which is formed by surface structure in the second layer 4. Vertically extending through holes 8 and 10 are formed in the second and third layers 4 and 6 which are in fluid communication with the microfluidic channel 12. As illustrated, the through hole 10 in the second layer 4 need not exactly correspond dimensionally to the through hole 8 in the third layer 6. The hole 10 in the second layer acts as a conduit for fluid communication between the channel 12 and the via 8. The purpose of the via 8 is to provide external access for the supply or removal of fluid, i.e. liquid or gas, from the microfluidic circuit formed at the interface 23/41. In implementations of the design, the precise form and dimensions of the features 8 and 10 may be varied both in absolute terms and relative to each other. For example, the conduit 10 could be a microchannel or at least much narrower than the via 8 in third layer 6, so long as in fluid communication with the lateral microfluidic channel 12, or other microfluidic circuit feature in the plane of the interface 23/41.

To form a fluid-tight seal around the holes 8 and 10 and between the layers 4 and 6, so as to prevent liquid leakage or pressure loss between the layers 4 and 6, a ring-shaped continuous seam weld 20 is formed at the interface 43/61 between the second and third layers. The ring-shaped weld forms a closed path around the holes 8/10 in the plane of the interface 43/61. The weld is formed by an optical welding process described below. The optical welding process temporarily melts the material at, and adjacent to, the interface 43/61 using an intense optical beam which is directed to move in the closed path. The intense optical beam will most typically be a laser beam generated by a suitable laser, but other light sources, for example superluminescent diodes, could be used. It is also desirable for the weld 20 to be as close as possible to, or at least not very far from, the side walls of the holes 8/10.

The laser weld is structurally stable over a long period. Moreover, the laser weld, or more typically a plurality of such laser welds in the plane of the interface between two layers, can serve to bond two layers together, e.g. as the sole bond. Another advantage of the laser weld is that it can be used to bond layers made of chemically dissimilar materials, for example different polymers which it may not be possible to chemically bond using solvent vapour bonding or other chemical bonding method.

Figure 2A:
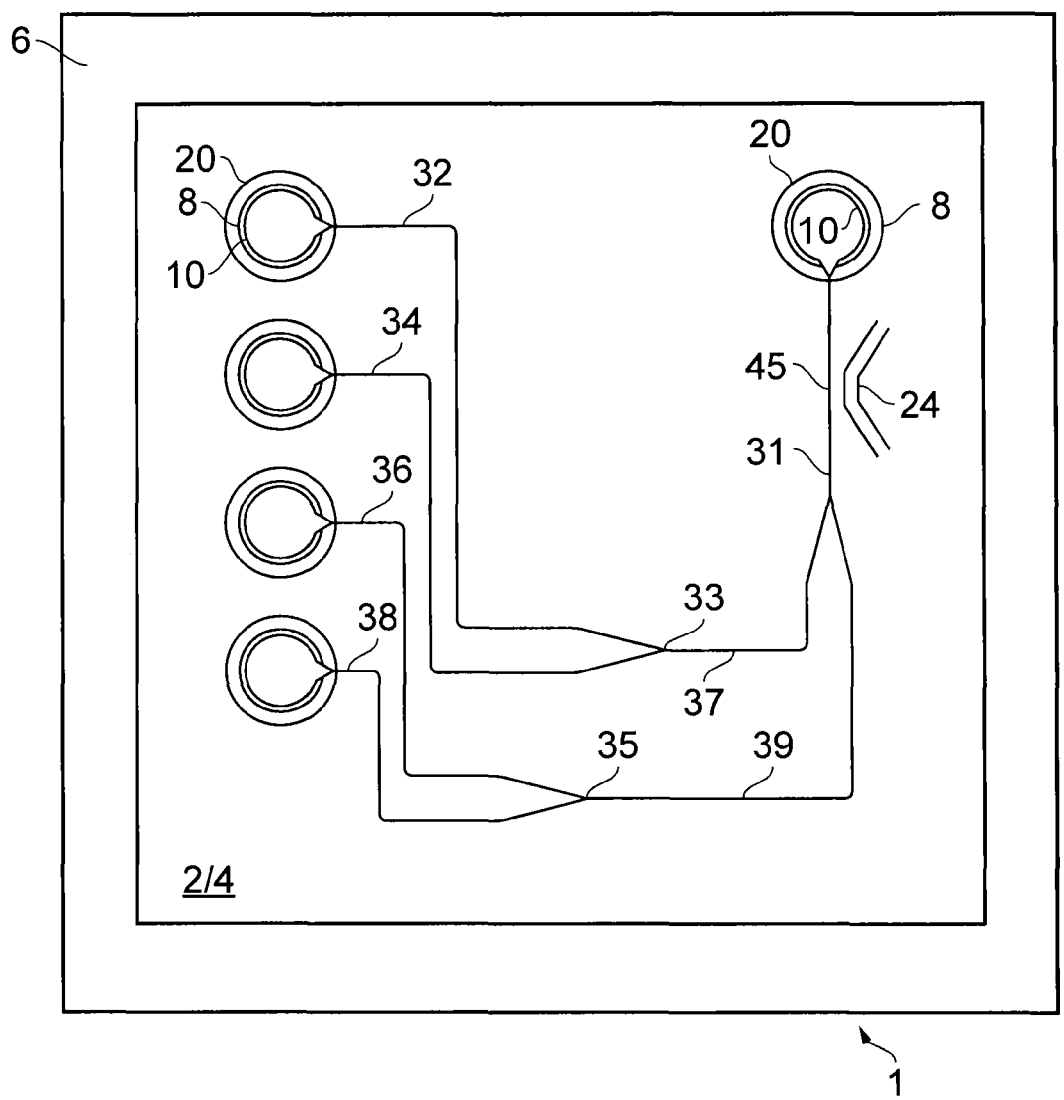
FIG. 2A is a schematic plan view of the microfluidic device of the first embodiment.
Figure 2B:
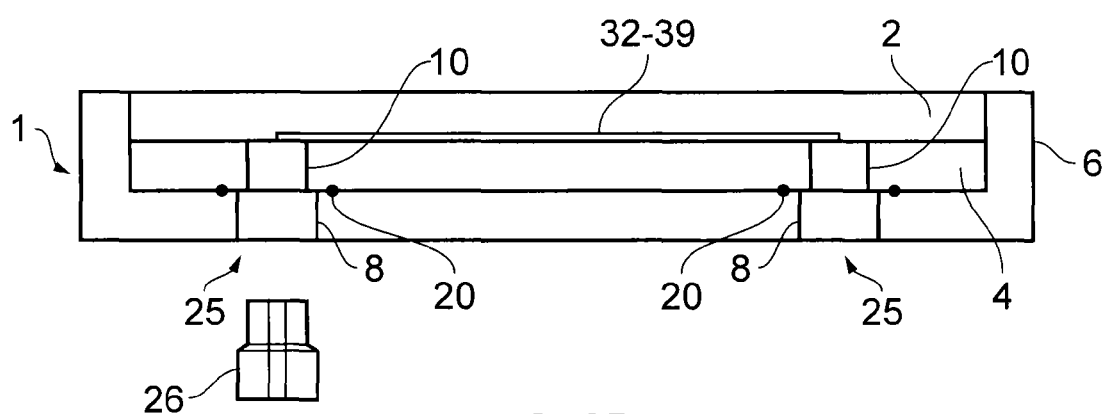
FIG. 2B is a schematic cross-section of the microfluidic device of the first embodiment.

FIG. 2A is a schematic plan view of the whole microfluidic device 1 of the first embodiment. FIG. 2B is a corresponding schematic cross-section, also showing a male luer connector 26 shaped and dimensioned to engage into the female luer connector formed by the holes 8 and 10.

The third layer 6 is part of a carrier or caddy accommodating the microfluidic circuit formed by the bonded first and second layers 2 and 4. The carrier has side walls 7 which wrap around the edges of the first and second layers 2 and 4.

A highly schematic microfluidic circuit is depicted, consisting of four female luer connectors 25 with laser welds 20 as inlet ports, from which extend channels 32, 34, 36 and 38. Channels 32 and 34 join at a mixing connection 33, and channels 36 and 38 join at a mixing connection 35, the two merged channels 37 and 39 then in turn combining at a mixing connection 31 into a channel 45. An electrode portion 24 is also shown adjacent the channel 45 and serves, for example, to coalesce droplets of analyte and sample liquid passing along the channel. The channel 45 terminates in an outlet port 25 with laser weld 20. It will be appreciated that in some implementations some of the inlet/outlet ports may be sealed with O-rings (or other gasket types) and others with continuous seam welds.

Figure 3:
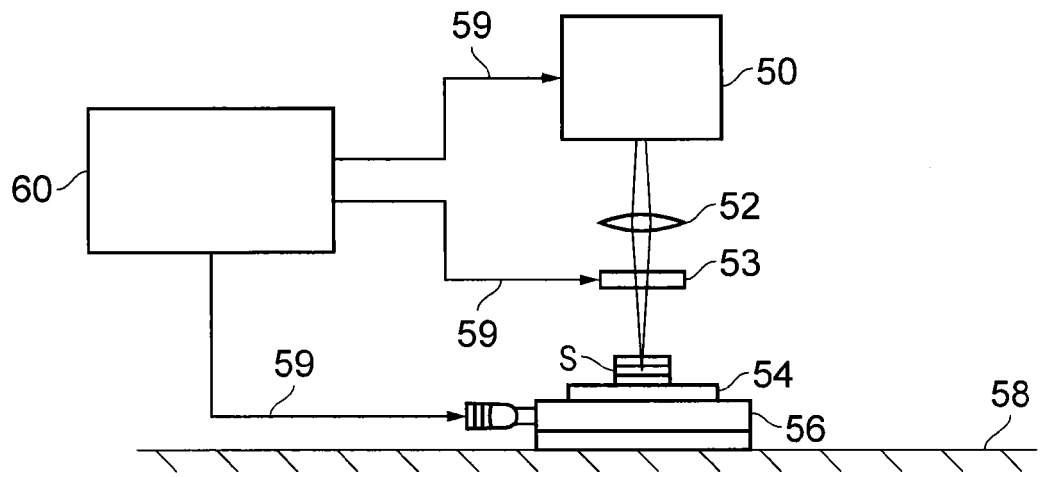
FIG. 3 is a schematic drawing of a laser welding apparatus for forming weld seals during manufacture of the microfluidic device according to embodiments of the disclosure.

FIG. 3 is a schematic drawing of a laser welding apparatus for forming weld seals during manufacture of the microfluidic device according to embodiments of the disclosure. A laser unit 50 is operable to generate a laser beam B which is collimated or focused by an objective lens 52 and then directed by a scanner 53 which will typically comprise a steerable mirror assembly. A sample S to be welded comprising the layer structure illustrated in FIGS. 1, 2A and 2B, for example, is arranged on a sample holder 54 which is in turn arranged on a motion stage 56, for example an xyz-stage or xy-stage arranged on a workbench 58. The motion stage may be used to move the beam laterally over the sample, for example cooperatively with the scanner 53 under joint computer control from a computer 60. As illustrated, the computer 60 may control the laser 50, scanner 53 and motion stage 56 by respective communication lines 59.

In a specific example, the laser used to perform welding was a "Trumpf TruMark Series 3000" diode pumped Nd:YAG laser with a wavelength of 1064 nm. The beam was focused to a 50 µm diameter spot size. The spot was oscillated laterally to provide a desired welding line width of, for example, 0.35 mm.

Figure 4:
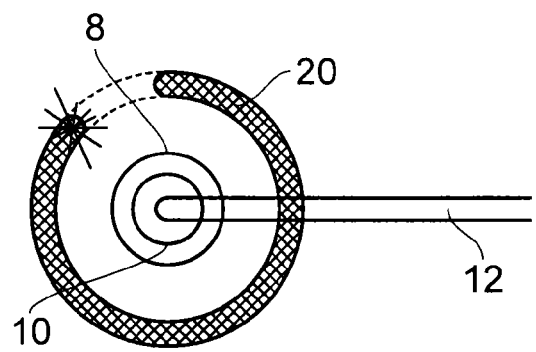
FIG. 4 is a schematic plan view showing a nearly-completed weld seal during the laser welding.

FIG. 4 is a schematic plan view showing a nearly-completed weld seal during a laser welding process. The sidewalls of the concentric holes 8 and 10 are shown by the concentric circles together with the channel 12 which terminates inside the holes 8 and 10. The optical beam forms a spot of suitably high intensity to cause local melting of the substrate materials at and on both sides of the relevant interface, and the spot is then moved in an arc until a complete circle has been described. In the illustration, the weld has been formed by clockwise motion and is nearly complete, its instantaneous position being schematically illustrated by a star burst symbol. The laser beam inevitably passes over the channel 12 at some point (at 3 o'clock in FIG. 4). Although this could be expected to result in significant scattering of the beam, our tests show that the presence of the channel does not prevent a good weld from forming at the next interface directly beneath it as might be expected.

In an alternative implementation, the high intensity optical beam could be annular, i.e. ring-shaped, for example through the use of an attenuator placed in the optical axis, so a ring-shaped seam weld is produced with a static beam.

Figure 5A:
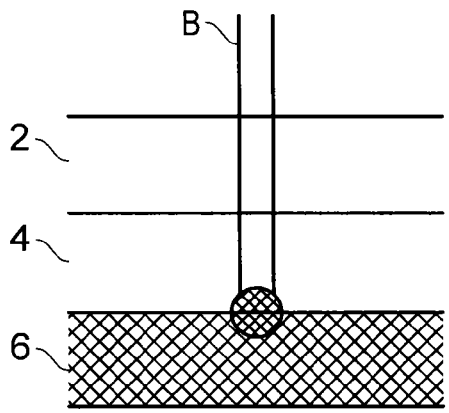
FIG. 5A shows in cross-section the optical beam for a first welding mode.

FIG. 5A shows in cross-section the optical beam for a first welding mode in which differences in transmissivity of the substrates are used to promote the local melting. Namely, the optical beam is introduced from above through the first and second layers 2 and 4, which are both substantially transparent or transmissive to the wavelength of the light beam, and then reaches the third layer, which is substantially opaque or absorptive to the beam wavelength. The energy from the optical beam is then rapidly absorbed as it enters the third layer causing local heating and melting, predominantly in the third layer, but also to some extent in the second layer as a result of thermal conduction. The optical beam is illustrated as being collimated or very weakly convergent, i.e. a pencil beam, although a more strongly convergent beam could be used.

Figure 5B:
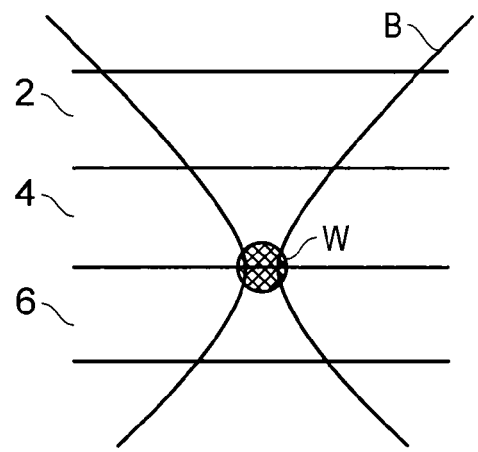
FIG. 5B shows in cross-section the optical beam for a second welding mode.

FIG. 5B shows in cross-section the optical beam for a second welding mode in which beam focusing is used to localize the heating and consequent melting. In this mode, the optical beam is focused with a high numerical aperture lens arranged close to the surface of the sample, and the intensity of the beam only exceeds the threshold required to induce local melting close to the beam waist W or focal point. By arranging the focal plane of the optical beam to be coincident with the interface to be welded, the weld can be created in the desired manner. The second welding mode places more stringent requirements on vertical position control and laser energy control than the first mode, but does not place restrictions on the substrate materials regarding their transmissivity/opacity.

It will be appreciated that both the first and second welding modes can be combined.

A significant advantage of the laser weld is that it its integrity can be assessed optically, the simplest inspection test being an operator viewing the weld under a microscope and applying a subjective pass/fail based on the weld's appearance. The test is also amenable to automation using digital image capture and image processing. For example, automated machine vision systems from "Keyence Corporation" could be used, or confocal microscopes. It is noted that the welds can be clearly imaged by phase contrast, and defects in the welds, such as voids or misalignment, can be detected easily in this way. Moreover, phase contrast imaging allows the welds to be discriminated easily from conventionally thermally bonded surfaces. The ability to perform an optical inspection is a significant advantage compared to O-ring seals or other gaskets where it is necessary to perform gas pressure testing and/or liquid leak testing of the assembled product, which is not only more onerous, but also has the potential for causing contamination. Moreover, the optical inspection of the welds may be combined with an optical inspection of the microfluidic circuit, simply by shifting the focal plane of the microscope between the interface 23/41 and the interface 43/61.

Figure 6:
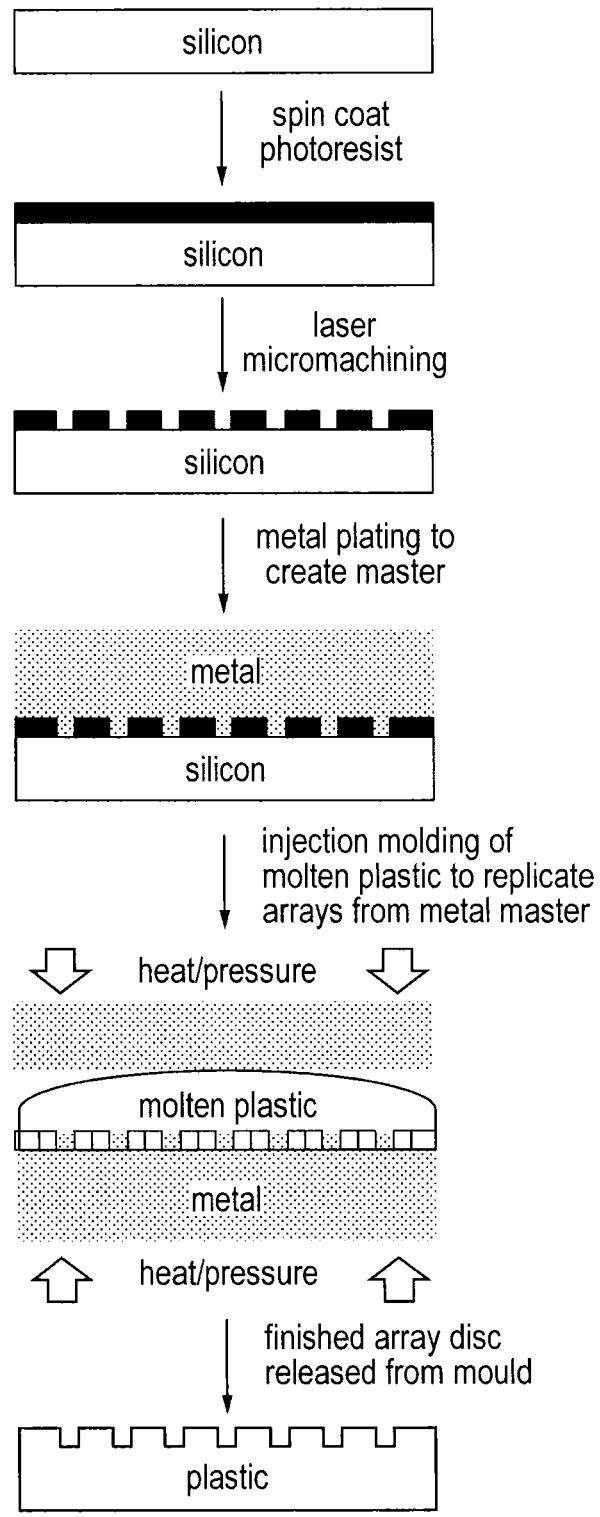
FIG. 6 shows the principal steps in a substrate manufacturing process.

FIG. 6 shows the principal steps in a substrate manufacturing process using injection moulding.

The first part of the process is to manufacture a master.

A silicon or glass wafer is spin coated with a photoresist. An excimer laser or other suitable light source is then used to expose the photoresist to define a structure with high spatial resolution, for example by direct laser micromachining. The material to be exposed is transparent to the laser light used. However, in the focal volume of this highly focused laser beam chemical or physical modification is created. Ultimately a selective solubility of the exposed area relative to the surrounding is achieved. In a developer bath, depending on the used photosensitive material exposed or unexposed areas are removed. Thus, almost any 3D structures from a variety of photosensitive materials can be realized (i.e. SU-8). Alternative technologies for structuring the resist master are e-beam lithography or mask based lithography processes. Laser write lithography can also be used with inorganic phase transition materials instead of the photoresist pushing the size resolution limit below the wavelength of the laser. Further details of applicable processes can be found in JP4274251 B2 (=US2008231940A1) and JP 2625885 B2 (no English equivalent).

Once the photoresist has been suitably structured and the exposed (or non-exposed) material removed, a metal plating processing step is applied. Electroplating is used to deposit a nickel layer by electrolysis of nickel salt-containing aqueous solutions, so-called nickel electrolytes. Nickel electrolytes usually have nickel or nickel pellets as the anode. They serve the supply of metal ions. The process for the deposition of nickel has long been known and been highly optimized. Most nickel electrolytes to achieve an efficiency of >98%, which means that over 98% of the current supplied to be used for metal deposition. The remaining power is lost in unwanted electrolytic processes, such as hydrogen. The transcription of lithographically structured micro-features is strongly dependent on compliance with the correct parameters. The continuous supply of additives, but also the metal ion content and the temperature and the pH value needs to be.

This electroplating process can be repeated either to make multiple copies of the same master from the silicon or to create a negative copy from the first metal stamper that is produced from the silicon.

Direct milling into steel can be used as an alternative to silicon and photoresist in order to master such microstructures.

The master is then used in an injection molding process to create the structured surfaces in polymer. In an injection molding machine, polymers are plasticized in an injection unit and injected into a mold. The cavity of the mold determines the shape and surface texture of the finished part. The polymer materials need to be treated carefully to prevent oxidation or decomposition as a result of heat or sheer stresses. Heat and pressure are applied to press molten polymer onto the structured surface of the master. After a suitable filling, cooling and hardening time, the finished structure is ejected from the mold.

The cost of the master and the larger molding tool it will form a part of represents a large part of the total necessary investment, so the process lends itself to high volumes. Simple tools enable economic viable prototyping from a threshold of a few thousand parts. Tools for production can be used up to make up to several million parts.

Suitable base polymers for the substrate layers include: polystyrene (PS), polypropylene (PP), polyethylene (PE), cycloolefin (co-) polymer (COP), styrene-acrylonitrile copolymer (SAN), polyamide (nylon), polyimide (PI), polycarbonate (PC), and polymethyl methacrylate (PMMA). Specific example plastics compounds are as follows. PS: BASF '158K' which is a high heat, clear material suitable for injection molding. COP: Zeon Chemicals 'Zeonor 1060R' which is a clear, low water absorption material suitable for injection molding. PMMA: Asahi Kasei 'Delpet 70NH' which is transparent and suitable for injection molding. PP: Lyondell Basell Industries 'Purell HM671T'.

The injection molded substrate can be further plasma treated to control the surfaces properties.

Moreover, a coating can be applied to a whole surface or selectively applied to only some areas as desired. For example, sputtering may be used to deposit a coating.

Finally, it is noted that the carrier may not include features requiring precision on the same small size scale as the layers which are used to form the planar microfluidic circuit elements. It will therefore be possible in some cases to manufacture the carrier using simpler or alternative methods.

In summary, the above embodiment has described a microfluidic device comprising in sequence first, second and third layers, wherein a laterally extending microfluidic channel is formed at the interface between the first and second layers by surface structure in one or both of the first and second layers, wherein a via is formed in the third layer, and wherein a conduit is formed in the second layer to provide fluid communication between the microfluidic channel and the via, there being a weld formed at the interface between the second and third layers in a continuous closed path around the via. Moreover, the third layer is part of a device frame or carrier part which extends around and accommodates the first and second layers.

Figure 7:
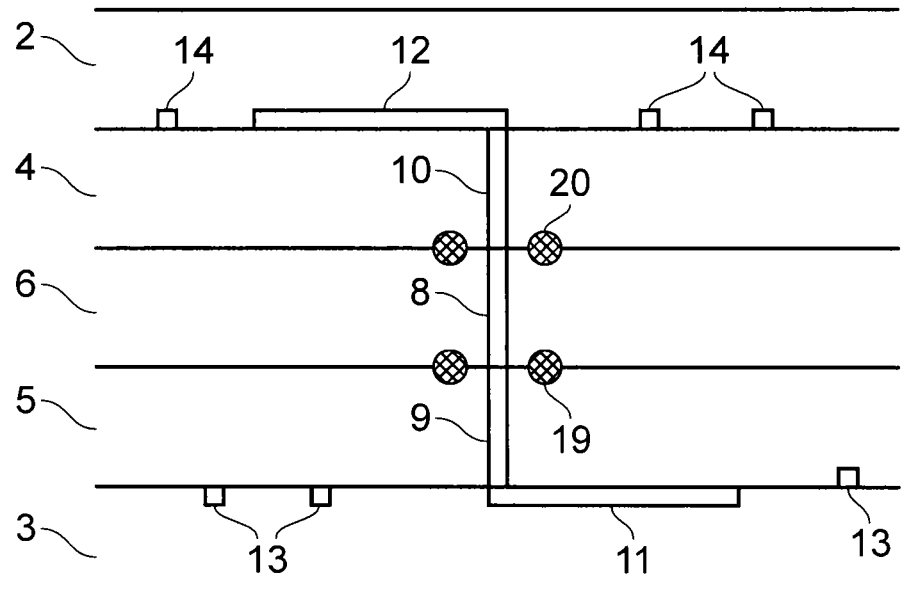
FIG. 7 shows a further embodiment in schematic section.
Figure 8:
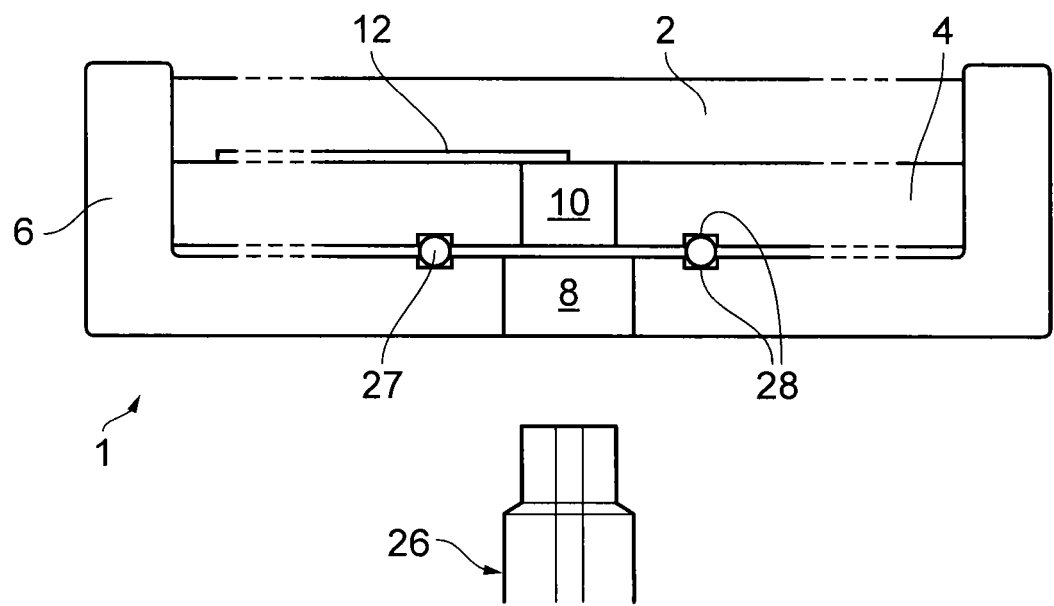
FIG. 8 is a schematic cross-section showing features of a conventional microfluidic device, in particular an external fluid connector.
Figure 9:
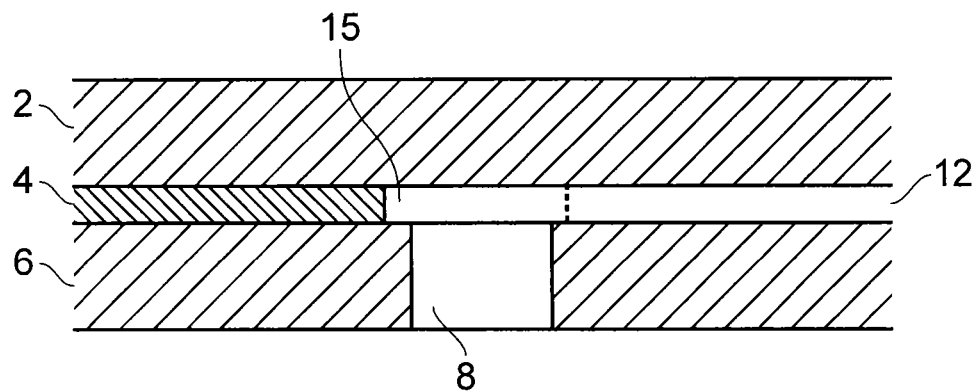
FIG. 9 is a schematic cross-section showing features of a specific prior art device from US 2011/0243813 A1.
Figure 10:
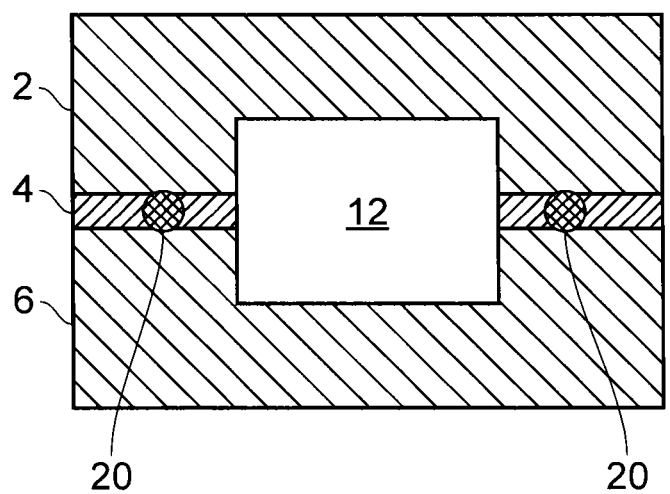
FIG. 10 is a schematic cross-section showing features of a specific prior art device from WO 2011/113630 A2.

FIG. 7 shows a further embodiment in schematic section in which welds similar to those of the first embodiment are used in a five layer structure to allow two different microfluidic circuits formed in two different interface planes to be connected. The topmost three layers 2, 4, 6 and their associated features 8, 10, 12, 14, 20 are labeled with reference numerals corresponding to FIG. 1 for ease of comparison with the first embodiment. The only difference in these features compared to FIG. 1 is that the holes 8 and 10 are of relatively narrow diameter and also of the same diameter as each other, to form a vertically extending channel continuously with the laterally extending channel 12. Two further layers 5 and 3 are provided which can be considered to be the mirrors of layers 2 and 4, in that a further microfluidic circuit is formed at the interface between the layers 3 and 5 including a laterally extending channel 11, in that a weld 19 is formed at the interface between layers 5 and 6, and in that layer 5 has a vertical hole 9 aligned with the hole 8 in layer 6 and in fluid communication with the lateral channel 11. The microfluidic device of FIG. 7 thus comprises two microfluidic circuits joined to form a single larger microfluidic circuit distributed in two planes and interconnected by a via channel 10, 8, 11. At the interface between layers 4 and 6, the vertical channel junction from channel portions 10 to 8 is sealed by a weld 20. At the interface between layers 6 and 5, the vertical channel junction from channel portions 8 to 9 is sealed by a further weld 19. It will be understood that multiple vias of this type may be fabricated in a single microfluidic device to form multiple connections between different parts of the circuit portions at the interface 2/4 and 3/5 respectively. Furthermore, external inlet/outlet ports such as female luer connections may also be formed in an analogous manner to the ports described with reference to the first embodiment, either through the top surface of layer 2 or the bottom surface of layer 3, or both.

In this further embodiment, if the first welding mode is to be used, then layer 6 is opaque, whereas the other layers are transparent, and the weld 20 will be created by illumination from above, whereas the weld 19 will be created by illumination from below. In practice, with reference to FIG. 3, this will mean flipping the device over in the sample holder and performing two welding sessions. On the other hand, if the second welding mode is used all layers will be transparent, or at least sufficiently transmissive for optical beam access to the interfaces, and there is at least the possibility of creating all the welds from one side of the device, although it may be better to weld from both sides to avoid welding more deeply into the layered structure than is necessary.

CROSS-REFERENCE TO RELATED APPLICATIONS

The present application claims priority of EP patent application No. 12 188 347.4 filed on 12 Oct. 2012, the entire contents of which are incorporated herein by reference.

The invention claimed is:

1. A microfluidic device comprising:
a first substrate;
a second substrate bonded to the first substrate at an interface between the first substrate and the second substrate;
a microfluidic circuit formed at the interface by surface structure in one or both of the first and second substrates;
a third substrate having a plurality of vias which are in fluid communication with the microfluidic circuit through respective conduits in the second substrate;
a plurality of laterally extending channels that are formed at the interface of the first substrate and the second substrate and are connected to a respective via; and
a plurality of seam welds, each extending continuously in a closed path around respective ones of the vias, each seam weld serving to weld together the second and third substrates and form a fluid-tight seal for fluid flow between that via and the microfluidic circuit,
wherein a portion of a respective seam weld is vertically aligned with a respective laterally extending channel.

2. The microfluidic device of claim 1, wherein the third substrate extends around and accommodates the first and second substrates to form at least part of an external housing by which the device can be handled.

3. The microfluidic device of claim 1, wherein the substrates are made of plastics materials.

4. The microfluidic device of claim 3, wherein the bond between the first and second substrate is a solvent vapour bond.

5. The microfluidic device of claim 3, wherein the plastics materials are polymers.

6. The microfluidic device of claim 5, wherein the first and second substrates are formed of substantially the same base polymer.

7. The microfluidic device of claim 5, wherein the third substrate is formed of a different base polymer from the second substrate.

8. The microfluidic device of claim 1, wherein the conduit and the via are formed as mutually aligned, vertically extending through holes in the second and third substrates.

9. The microfluidic device of claim 1, wherein the first and second substrates are substantially transparent or transmissive to a particular wavelength of light and the third layer is substantially opaque or absorptive to the particular wavelength.

10. The microfluidic device of claim 1, further comprising a fourth substrate and a fifth substrate bonded to the fourth substrate, a further microfluidic circuit being formed by surface structure in one or both of the fourth and fifth substrates, the fourth substrate having a plurality of further conduits which bring respective ones of the vias, and thus the further microfluidic circuit, into fluid communication with the microfluidic circuit, and a plurality of further seam welds, each extending continuously in a closed path around respective ones of the vias, each further seam weld serving to weld together the third and fourth substrates to form a fluid-tight seal for fluid flow between the microfluidic circuit and the further microfluidic circuit.

11. A microfluidic device comprising:
a first substrate;
a second substrate bonded to the first substrate at an interface between the first substrate and the second substrate;
a microfluidic circuit element formed at the interface by surface structure in one or both of the first and second substrates;
a third substrate having a via which is in fluid communication with the microfluidic circuit element through a conduit in the second substrate;
a laterally extending channel that is formed at the interface of the first substrate and the second substrate and is connected to the via; and
a seam weld extending in a continuous closed path around the via to weld together the second and third substrates and form a fluid-tight seal for fluid flow between the via and the microfluidic circuit element,
wherein a portion of the seam weld is vertically aligned with the laterally extending channel.

12. A method of manufacturing a microfluidic device comprising:
providing an optical source operable to deliver an optical beam;
providing first, second and third substrates, one or both of the first and second substrates having surface microstructure, and the second and third substrates having at least one respective conduit and via pair;
bonding the first and second layers to each other such that the surface microstructure forms a microfluidic circuit at the interface between the first and second substrates;
arranging the second and third substrates in juxtaposition such that the respective conduits and vias align and a plurality of laterally extending channels formed in the interface of the first substrate and the second substrate is connected to respective vias; and
arranging the optical source to deliver the optical beam through the first and second substrates to the third substrate; and
operating the optical beam to form a continuous seam weld between the second and third substrates in a closed path around the via,
wherein the optical beam passes through the channel while forming the continuous seam weld.

13. The method of claim 12, wherein the first and second substrates are substantially transparent or transmissive to a particular wavelength of light and the third substrate is substantially opaque or absorptive to the particular wavelength.

14. The method of claim 12, comprising an objective lens arranged to bring the optical beam to a focus in the plane of the interface between the second and third substrates such that it causes melting confined to a region local to the interface.

15. The method of claim 12, wherein the optical source is a laser.

16. An inspection method for a microfluidic device manufactured according to claim 12, comprising an optical inspection of integrity of the weld using a microscope.

\* \* \* \* \*